March 25, 1941. R. F. EDGAR 2,236,287
METHOD OF AND APPARATUS FOR MEASURING SURGES
Filed Nov. 29, 1939
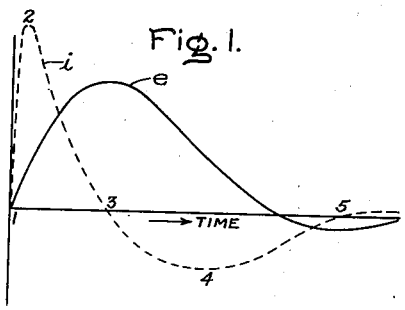
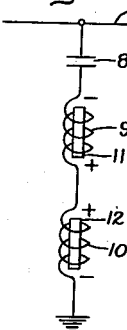
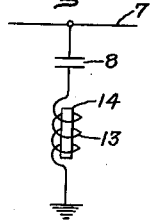
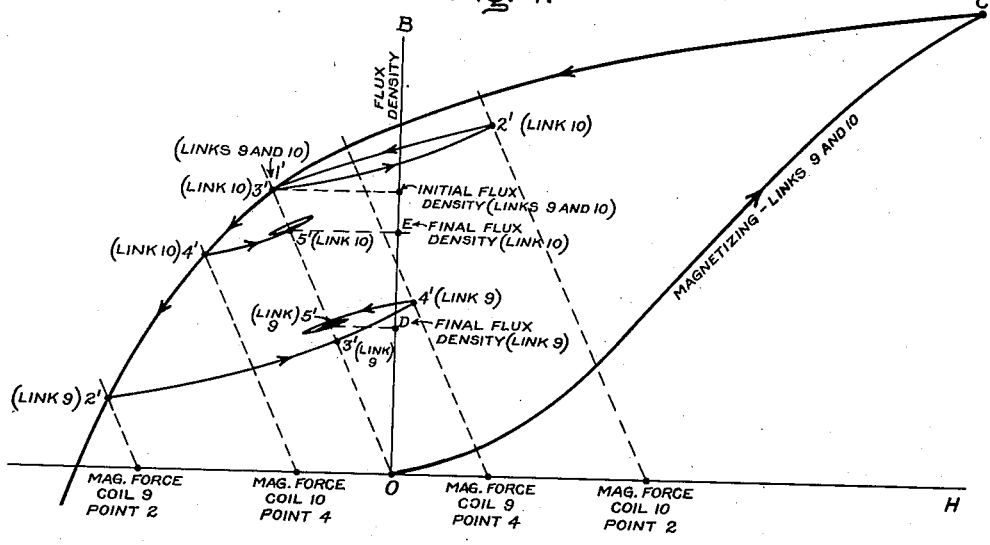
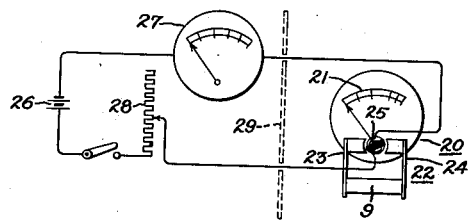
Inventor:
Robert F. Edgar,
by Harry E. Dunham
His Attorney.

Patented Mar. 25, 1941

2,236,287

UNITED STATES PATENT OFFICE 2,236,287

METHOD OF AND APPARATUS FOR MEASURING SURGES

Robert F. Edgar, Pattersonville, N. Y., assignor to General Electric Company, a corporation of New York Application November 29, 1939, Serial No. 306,693

11 Claims. (Cl. 175—183)

This invention relates to surge measurements.

An object of my invention is to provide a method of and apparatus for measuring the maximum rate of change of surges of either polarity.

Another object of my invention is to provide a simple method of and apparatus for measuring the steepness of wave-front of voltage surges on transmission lines.

A further object of my invention is to provide a method of and apparatus for measuring the maximum rate of rise of a voltage surge and for indicating the maximum rate of fall in the voltage surge after the peak is reached, the indication to remain visible after the occurrence of the surge. Other objects and advantages will become apparent as the description proceeds.

There has long been a need in the electrical industry for a simple and inexpensive indicating instrument that will accurately measure and indicate the steepness of wave-front of voltage surges on transmission lines even though the surge be of a non-recurring nature or lasts for only a few microseconds, the indication to remain visible after the surge is over. The intelligent design of transformers and other equipment depends upon the knowledge of the rate of rise of voltage which the equipment must withstand and because of the limited knowledge available equipment is usually built with a high safety factor. Obviously, more extensive data would permit less expensive and better designs of equipment and at the same time serve as a useful guide in determining other necessary steps to be taken for decreasing the number of drop-outs on a transmission system. Since neither the time nor the place at which such system disturbances may occur can be predicted, it is necessary to have a large number of instruments installed over a wide area continually in readiness for operation the moment a surge takes place. It therefore became desirable to provide a simple method or a simple, inexpensive, and easily installed instrument, or both, that will measure and indicate the maximum rate of change of a voltage surge irrespective of its duration, the indication to remain visible after the surge is over. My invention provides such a method and such an instrument.

Briefly stated, the theory of my invention is that if a capacitor is subjected to the voltage surge under consideration, the current which flows in the capacitor is a measure of the rate of rise of the voltage or steepness of the wave-front. The maximum value of this current is a measure of the maximum rate of rise of the voltage. In carrying my invention into effect, I connect a capacitor element to the transmission line at the point the measurement is desired and in circuit with two magnetizing coils. In each of the coils I position links or cores of magnetic material possessing a high degree of magnetic retentivity, the cores or links being originally magnetized substantially to saturation. The coils and the magnetic links are so arranged relative to each other that the field produced by the coils is of opposite polarity in the two links with respect to the initial polarity of the links. The link which is demagnetized the most will indicate the maximum steepness of the voltage wave as well as its polarity. The less severely demagnetized link will indicate the maximum rate of fall in voltage after the peak is reached. The strength of the magnetic flux retained by each of the magnetic bodies after the occurrence of the surge is measured by placing each of them in the field circuit of an indicating instrument which is responsive to this flux and which gives an indication that is proportional to the strength of this flux. The instrument may be calibrated in terms of rate of change of voltage with respect to time or in terms of the maximum current in the capacitor circuit.

In a modification, and within my invention, I employ a single coil and magnetic link in the circuit of the capacitor. For example, in those situations where the voltage surge is of such a character that the current flowing through the capacitor has only one peak, it is sufficient to use merely a single magnetic link in the unmagnetized condition or in those cases where the polarity of the surge is known in advance, the link may be initially magnetized to its fullest extent. In the latter case, the first half cycle of current will substantially demagnetize the magnetic link and in the former case the link will be magnetized to the crest value of the current.

My invention will be better understood from the following description when considered in connection with the accompanying drawing and its scope will be pointed out in the appended claims.

Fig. 1 represents by the full line a wave of a typical non-recurring voltage surge and by the dotted line a current wave produced by this voltage surge. Figs. 2 and 3 represent apparatus for measuring the steepness of wave-front of a voltage surge in accordance with my invention. Fig. 4 represents hysteresis loops of the magnetic links which will be used in explaining the principle of operation of my invention. Fig. 5 is a diagrammatic representation of an electrical circuit including a d'Arsonval type measuring instrument for measuring the magnetic flux retained by the magnetic links after a voltage surge. Similar parts in the various figures are represented by the same reference characters.

Referring to Fig. 1 of the drawing, the letter *e* represents a wave of a typical voltage surge which might take place on a transmission line and the letter *i* denotes the wave of a current which would flow if the voltage *e* were impressed across a capacitor element. If a voltage such as *e* is impressed across a capacitor having a capacitance of C farads, the current *i* flowing in the circuit at any instant is $$i = C \frac{de}{dt}$$

where *t* is in seconds. In other words, this current is a measure of the rate of change of the voltage with respect to time or the steepness of the wave-front. The maximum value of this current is a measure of the maximum rate of rise or rate of fall of the voltage, as the case may be.

Referring to Fig. 2, I have shown a transmission line 7 to which is connected a capacitor 8 and a plurality of magnetizing coils 9 and 10. Within these coils are positioned magnetic links 11 and 12, respectively, which, with the coils wound in the same relative direction, are arranged in the circuit with their initial polarities as indicated. By using two links which are inserted into their respective coils so that the field of the coils is of opposite polarity in the two links with respect to the initial polarity of the links, I am able to provide for the measurement of surges of either polarity. The link which is demagnetized the most will indicate the maximum steepness of the voltage wave as well as its polarity while the less severely demagnetized link will indicate the maximum rate of fall of the voltage after the peak is reached.

The capacitor element 8 may be a porcelain insulator or a series of insulators, the capacities of which may be in the order of 10 micro-microfarads. The coils 9 and 10 are preferably made just large enough to admit the magnetic links and they are preferably wound with a single layer of from 10 to 40 turns depending upon the material of the link and the other circumstances of the circuit as well as on the range of measurement desired. The magnetic links 11 and 12 may be composed of any suitable material possessing a high degree of magnetic retentivity so that they will retain an appreciable amount of flux after the surge is over. I have found that satisfactory results may be obtained by the use of cobalt steel or by the use of magnetic materials formed from alloys of nickel, iron and aluminum and, if desired, a small amount of cobalt, such as described in United States Patents 1,947,274 and 1,968,564 to William E. Ruder, and assigned to the same assignee as the present invention.

In Fig. 3 I have illustrated a modified arrangement which may be employed when the voltage surge or wave is of such character that the current flowing through the capacitor element is of a unidirectional character. As in Fig. 2, the capacitor 8 is connected between ground and the transmission line 7 and in circuit with a magnetizing coil 13. In this case, the magnetic link 14 may be originally in the unmagnetized condition or it may be initially magnetized to its fullest extent.

Consideration of the hysteresis loops illustrated in Fig. 4 will provide a better understanding of the principle of operation of my invention. In Fig. 4, the abscissa OH represents magnetizing force, the ordinate OB represents flux density, and OC represents the virgin magnetization curve of the magnetic elements 9 and 10 of Fig. 2. The magnetic links 11 and 12 are initially magnetized to their fullest extent as indicated by the point C and are then removed from the magnetizing circuit and placed inside the respective coils 9 and 10 with the relative polarities, as indicated. As soon as the magnetizing force is removed and the links are taken out of the magnetizing circuit, the flux density falls to the point indicated where the diagonal dotted line from the origin O intercepts the hysteresis loop. The slope of this line is determined by the length and cross section of the magnet material and by the reluctance of the external magnet circuit through the air from one pole to the other. This point on the hysteresis loop is designated as point 1' corresponding to point 1 of the current wave illustrated in Fig. 1.

Assume now that the non-recurring voltage wave *e* is impressed across the circuit of Fig. 2 including the capacitor element 8 and the two magnetizing coils 9 and 10 which are positioned about the magnetic links 11 and 12, respectively. As the surge voltage represented by the wave *e* is impressed on the circuit of Fig. 2, the current through the two coils 9 and 10 has instantaneous values as represented by the wave *i*. It will be noted that the point 2 corresponds to the maximum point on the current wave, the point 3, the point where the current wave is passing through zero into negative direction, and the point 4 corresponds to the negative peak value of the current, while 5 represents the point where the current wave *i* passes through zero in the positive direction. In other words, at point 2 the slope of the voltage wave *e* is the greatest. At point 3 it is zero, and at point 4 the rate of change of voltage reaches a maximum in the negative direction.

From point 1 to point 2 on the current wave *i*, links 9 and 10 follow their respective paths as designated on the hysteresis loop, link 9 being severely demagnetized while link 10 is slightly remagnetized. While the instantaneous value of the current is decreasing in passing from point 2 to point 3 on the current wave, link 9 gains a slight amount of magnetization and link 10 returns to its original flux density. It will be observed at this point that link 9 is still severely demagznetized. From point 3 to point 4 on the current wave link 9 is somewhat remagnetized and link 10 is considerably demagnetized. Similarly, from point 4 to point 5, link 9 suffers a decrease in flux density while the flux density in link 10 is slightly increased. Succeeding smaller oscillations will cause the magnetization in the links 9 and 10 to traverse small secondary loops, finally stopping near their respective 5' positions resulting in final flux densities in the links 9 and 10 of OC and OE, respectively.

It is therefore clear that the demagnetization suffered by the link 9 is an indication of the magnitude of the first current peak while the magnitude of the flux retained by link 10 is an indication of the magnitude of the current peak of opposite polarity which corresponds, respectively, for the illustration given, to the maximum steepness of wave-front of the voltage surge before and after the peak is reached. Further consideration of the hysteresis loops will show that the magnetic links will indicate the highest value of current reached or the maximum rate of change of voltage whether it occurs in the first cycles or in succeeding cycles.

It might be expected without a more careful study of the operating conditions that the inductance of the coils 9 and 10 would have a pronounced effect on the shape of the current wave. Such, however, is actually not the case as will be shown from the following illustration. As an example of values which might be encountered in practice, a voltage rise of 1000 kilocycles per microsecond is considered to be about the steepest wave-front and it may be expected to reach its peak in about one microsecond. Assuming that a 10 micro-microfarad capacitor is employed, a current of 10 amperes will flow in the capacitor which will produce a field of approximately 100 oersteds inside a coil having 20 turns per inch. Consider now an equivalent sine wave having a frequency of 250 kilocycles per second. In this case, the sine wave will reach a peak in one microsecond which is the time assumed for the surge voltage under consideration to reach its peak. The reactance of the capacitor would be about 64,000 ohms under such conditions while the inductance of each of the magnetizing coils 9 and 10 would be in the order of 2 to 4 microhenries, giving a reactance of only 3 to 6 ohms, which is obviously negligible as compared to the reactance of the capacitor.

In Fig. 5 I have illustrated diagrammatically an electrical circuit diagram including suitable apparatus which may be employed for measuring the degree of magnetization of the magnetic links used in carrying out my invention. In accordance with the arrangement illustrated, I provide a sensitive moving coil instrument of the d'Arsonval type and substitute the magnetized link to be measured for the usual magnet of the instrument. Under such conditions, the deflection of the instrument pointer will be proportional both to the degree of magnetization and the current flowing in the moving coil circuit of the instrument. It is obvious then that if the moving coil current be maintained at some constant value, the instrument indication will be proportional to the magnetization of the magnetic link and the scale may be calibrated to read in direct proportion to the maximum rate of change of voltage or the crest value of the current which flows in the capacitor circuit.

Referring more particularly to Fig. 5 of the drawing, I have illustrated a d'Arsonval type measuring instrument 20 having a scale 21 and a field structure 22 comprising pole pieces 23 and 24 between which rotates the usual moving coil element 25. The magnetic circuit is arranged to receive one of the magnetic links, such as 9 for example, the degree of magnetization of which is to be measured. A source of unidirectional current 26 may be employed for energizing the moving coil 25 of the instrument. An electrical instrument, such as a milliammeter 27, is preferably connected in the circuit with the moving coil 25 for indicating the magnitude of the current flowing in the moving coil and the rheostat 28 may also be included in this circuit to provide for adjusting the current to a predetermined value. An element 29 composed of relatively permeable material may be provided to shield the instrument 20 from extraneous magnetic fields.

The markings on the scale 21 are made proportional to the magnetizing force which is in turn proportional to the magnetizing current and in this case corresponds to the current which flows in the capacitor circuit. The pointer deflection is proportional to the magnetization of the magnetic link. In actual calibration, the markings on the scale may be checked by inserting in the instrument magnetic links which have previously been subjected to known magnetizing forces and observing the pointer deflection.

In operating the measuring apparatus of Fig. 5 it is necessary only to set the milliammeter current, as indicated by the scale of the instrument 27, at the required value, insert the magnetic link in position in the field structure 22 and obtain the reading from the scale 21 of the measuring instrument 20. By the use of such apparatus the degree of magnetization of the link may rapidly be determined with a degree of accuracy which is satisfactory for the usual system conditions. I wish to point out that while this particular method of and apparatus for measuring the magnetization of the magnetic links commends itself from the standpoint of simplicity, it forms no part of my invention and other well known methods and apparatus also may be employed.

The advantages obtained in the use of my invention will be evident from the following example. Assume that an electric power company operating a long transmission line supported by many towers wishes to determine with a minimum initial capital expenditure for instruments the maximum rate of rise of a surge voltage that may be impressed on the system. This may be accomplished by placing one of the units, such as illustrated in Fig. 2, at each of various points over the system, care being taken to have each magnetic link suitably marked with some identifying character to indicate the number of the tower arm to which it is adjacent. Only a single measuring instrument, such as illustrated in Fig. 5, is necessary and this may be permanently located in the testing laboratory or suitable location in one of the company's buildings. After the surge is over or at various times a patrolman makes a tour of the transmission line system to remove the magnetic link elements to the place where the measuring instrument 20 is located. The magnetic links are then tested in the instrument and a record made of the tower arm number corresponding to each element and the instrument reading obtained by testing each of the links. After testing, the magnetized elements may be remagnetized to their fullest extent in any suitable manner and they, together with any elements which did not become demagnetized because they were not subjected to a surge voltage, may be replaced in their original positions and used over again. This may be repeated from time to time by using the same magnetic links over and over again and employing only one instrument to make all the tests.

In accordance with the provisions of the patent statutes, I have described the principles of operation of my invention together with the apparatus which I now consider to represent the best embodiment thereof but I desire to have it understood that the apparatus shown and described is only illustrative and that the invention may be carried out by other means.

What I claim as new and desire to secure by Letters Patent of the United States is:

1. The method of determining the steepness of wave-front of a non-recurring voltage surge on an electrical conductor, which comprises deriving a current proportional to the rate of change of said voltage surge with respect to time, and then measuring the maximum value of said current.

2. The method of measuring the maximum rate of change of a non-recurring voltage wave with respect to time consisting in charging a capacitor with said voltage, and measuring the maximum value of the charging current of the condenser.

3. The method of measuring the steepness of wave-front of an electric non-recurring voltage surge, which comprises the steps of demagnetizing a permanent magnet by means of a flux derived from a current proportional to the derivative of the surge voltage wave with respect to time, and then measuring the strength of such permanent magnet.

4. The method of measuring the maximum rate of rise and fall of a non-recurring voltage surge on an electrical conductor, which comprises deriving a current proportional to the first derivative of said voltage surge with respect to time, influencing the degree of magnetization of two permanent magnet elements in relatively opposite directions at any instant in accordance with the magnitude of said current, and then measuring the strength of said permanent magnets.

5. The method of measuring the maximum rate of change of a non-recurring voltage surge with respect to time which comprises deriving a current from said voltage surge proportional to the first derivative of said voltage surge with respect to time, demagnetizing a field of residual magnetism by the influence of said current, and measuring the resultant magnetic field.

6. In a device for determining the steepness of wave-front of a non-recurring voltage surge on an electrical circuit, a capacitor supplied with a voltage proportional to said voltage surge, and means for determining the maximum value of the charging current of the capacitor.

7. In a device for measuring the maximum rise and fall of a non-recurring voltage surge on a conductor, an electrical circuit comprising a capacitor adapted to be charged by a voltage proportional to said voltage surge, and means in circuit with said capacitor for measuring the positive and negative crest values of the charging current of said capacitor.

8. In apparatus for giving a permanent indication of the steepness of wave-front of a non-recurring voltage surge that has occurred on a conductor, a circuit comprising a capacitor element and a magnetizing member adapted to be subjected to said voltage surge, a magnetic element of high magnetic retentivity positioned to be responsive to the magnetic flux produced by said magnetizing member, and means calibrated with said magnetic element and responsive to the magnetic flux retained by the magnetic element after the occurrence of the surge.

9. In a device for measuring the steepness of wave-front of a non-recurring voltage surge, a capacitor supplied with a voltage proportional to said voltage surge, a current conducting coil adapted to be energized by a current proportional to the charging current of said capacitor, a magnetic element of high magnetic retentivity adapted to be subjected to the magnetic field produced by said coil, and means for measuring the degree of magnetization of said magnetic element after the occurrence of the surge.

10. In a device for measuring the maximum rate of rise of a non-recurring voltage surge on an electrical conductor, an electrical circuit comprising a capacitor element and a magnetic flux producing member adapted to be subjected to said voltage surge, a permanent magnet element of high magnetic retentivity and initially magnetized substantially to saturation, said permanent magnet element being positioned to have its magnetism reduced by the influence of the current in said magnetic flux producing member, and means for measuring the residual magnetism of said permanent magnet element after the surge is over.

11. In a device for measuring the maximum rate of change in the magnitude of a non-recurring voltage surge before and after the peak is reached, a capacitor supplied with a voltage proportional to said voltage surge, a plurality of magnetic field producing elements adapted to be energized by a current proportional to the charging current of said capacitor, a plurality of permanent magnet elements of high magnetic retentivity, and having an initial residual magnetization produced by a magnetizing force of sufficient value substantially to saturate the material composing said magnets, one of said permanent magnet elements being arranged to be subjected to the magnetic field of one of said field producing elements, and the other of said permanent magnet elements being arranged to be subjected to the magnetic field of the other of said field producing elements, the arrangement of said permanent magnet elements relative to said magnetic field producing elements being such that at any instant and for a given direction of current flow in said field producing members the magnetic fields of said members have relatively opposite effects on the induction of said permanent magnet elements when compared with the initial polarities of said magnet elements, and means for measuring the degree of magnetization of said permanent magnet elements after the occurrence of said surge.

ROBERT F. EDGAR.